Dec. 23, 1969  B. D. STANTON  3,486,013
RATIO CONTROLLER
Filed Feb. 28, 1966  2 Sheets-Sheet 1

INVENTOR:
B. D. STANTON
BY:
HIS ATTORNEY

INVENTOR:
B. D. STANTON
BY:
HIS ATTORNEY 3,486,013
RATIO CONTROLLER
Benjiman D. Stanton, Walnut Creek, Calif., assignor to Shell Oil Company, New York, N.Y., a corporation of Delaware
Filed Feb. 28, 1966, Ser. No. 530,544
Int. Cl. G06f 15/46; G06g 7/58
U.S. Cl. 235—151.12                    6 Claims

ABSTRACT OF THE DISCLOSURE

A control system for in-line blending of materials having a long time constant memory circuit that is placed in parallel with the primary control loop.

---

This invention relates to control systems and more particularly to control systems for controlling the ratio between two phenomena.

In many industrial applications, especially in the chemical and petroleum industries, it is necessary to control two phenomena which vary with time and obtain a final result that is a function or ratio of the two phenomena. For example, many chemical processes require the mixing or blending of two materials to provide a mixture having a predetermined portion of each of the materials. In the past, such mixtures have normally been provided by what is known as a batch process. In the batch process one measures out the required amounts of the two materials and then mixes the two materials in a separate vessel.

To overcome the drawbacks of the batching process, inline blenders have been developed in recent years. Inline blenders utilize two flowing streams and control the rate of flow in one or both of the streams to provide the desired mixture of the two materials. Normally, it is possible to obtain good control by controlling only one of the streams and allowing the other stream to flow relatively free of constrain or control. When a large number of streams are blended together it is necessary to control each stream.

In Patent 3,089,643 there is shown and described a ratio or blending controller for controlling the ratio between two phenomena or two flowing streams. This patent describes a circuit in which two auxiliary capacitors are charged in relation to the magnitude of the two phenomena or flow rates. The two capacitors discharge in opposition into a reservoir capacitor, and the charge on the reservoir capacitor is then used as the control signal for a controller. The controller is of the integrating type and controls the flow in one stream.

In actual operation of this circuit the two auxiliary capacitors are coupled to a common ground and are provided with voltages of opposite polarity. The voltage supply is normally provided by means of a voltage dividing circuit with the ratio of the voltages being varied to vary the ratio of the two streams. The two capacitors are alternately connected to the voltage dividing circuit and to a discharge circuit. Normally, the switching is accomplished by polarized relays that are driven by the signals from flowmeters.

The two auxiliary capacitors are discharged in opposition to an operational amplifier that is provided with a relatively large capacitor in its feedback circuit. The capacitor in the feedback circuit acts as a reservoir capacitor to receive the net charge from the two auxiliary capacitors while the operational amplifier operating as an integrating circuit supplies a feedback voltage that is equal and opposite to the charge appearing on the reservoir capacitor. The feedback voltage is used as a control signal for a controller that controls the flow rate in one of the streams. Thus, the system controls the flow rate of one stream in order that a predetermined ratio between the two flowing streams may be obtained.

While this system has proven satisfactory in operation, problems have arisen in its use. Some of these problems have been the inability of the system to provide a zero error result and slow response of the system to changes. For example, assume that the blending control is used to control the blending of two gasolines with the mixture being supplied directly to a tank truck. It is desired to fill the tank truck as fast as possible and still obtain the desired blend of the two gasolines. Thus, the controller must have a relatively fast response to vary the flow in the controlled stream when the discharge valve to the tank truck is opened. This can only be obtained by making the reservoir capacitor relatively small. While this provides a relatively short memory or fast response control, it results in overshoot and oscillation of the control circuit. The overshoot and oscillation can become so severe as to trigger an alarm circuit and shut down the blending operation. To overcome the difficulty of oscillation and overshoot, it has been suggested that the time constant of the reservoir capacitor circuit be made relatively large by increasing the size of the feedback capacitor. While this smoothes out the control, it increases the memory and slows the response; thus the control system will not approach the required accuracy within the desired time period.

If one assumes that it requires two minutes to fill the average tank truck, then the control system should approach within 0.5% of the desired blend within a few seconds after the flow starts. If this speed of response is not obtained, the resulting blend will not meet the specifications. This response cannot be obtained by decreasing the memory of the circuit without the disadvantage of oscillations. Further since the memory circuit and controller are in series there is considerable instability in the control loop. Any change in the memory circuit has a direct effect on the controller since both are integrating circuits. Thus the final system was a compromise solution to the problems. Even with the comprise solution it was necessary to place limits on the response of various portions of the systems to prevent the development of undesirable conditions.

The present invention overcomes the above difficulties by removing the memory circuit from the primary control loop and placing it in parallel with the primary control loop. The memory circuit is a capacitance bridge circuit that is provided with a reservoir capacitor of relatively large size to provide a relatively long memory to achieve the acurate results and smooth control response. The capacitor bridge that is used for ratio control has a short time constant memory circuit to provide a fast response control that rapidly approaches the desired blend ratio. The signals from the two bridge circuits are combined in a difference amplifier with the long memory capacitance bridge being coupled to the positive input of the difference amplifier and the fast response capacitance bridge is coupled to the negative input. The reservoir capacitor for the fast response bridge circuit is disposed in the feedback circuit of the differential amplifier. Thus, the combination of the two circuits provides a means by which the blending controller will rapidly line out at approximately the correct blend ratio and then slowly approaches the exact blend ratio. The result of the two controls is a final mixture that is better than 0.5% of the desired ratio of the two products in a short time.

The above advantages of this invention and its actual operation will be more easily understood from the following detailed description of a preferred embodiment when taken in conjunction with the attached drawings in which.

Figure 1:
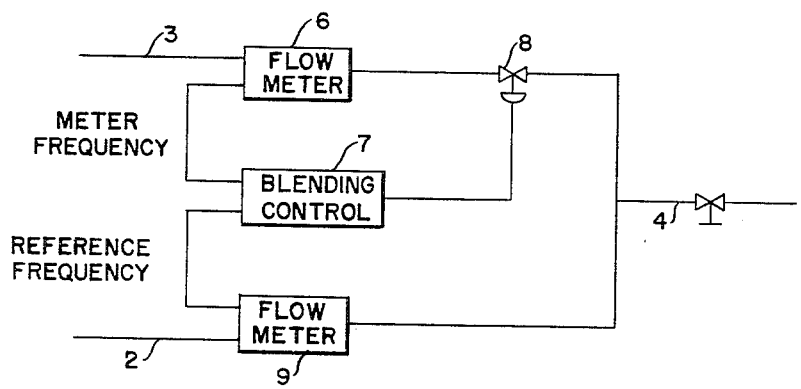
FIGURE 1 is a block diagram showing the use of the invention in a blending control.

FIGURE 1 illustrates a simplified diagram of a blending system in which the line 2 represents one product while the line 3 represents another product. The two products are blended and supplied through a common outlet 4 having a valve 5 disposed therein. The flow in the line 3 is measured by a flowmeter 6 coupled to a blending controller 7. The flow in line 2 is measured by a flowmeter 9 that is also coupled to the blending controller 7. The blending controller in turn controls the valve 8 and meters the amount of the product flowing in the line 3. By this combination one can control the ratio of the two products in the mixture delivered by line 4. Of course, the meter 9 can be placed in line 4 and provide a total flow reading while still providing the required input to the blending control.

Figure 2:
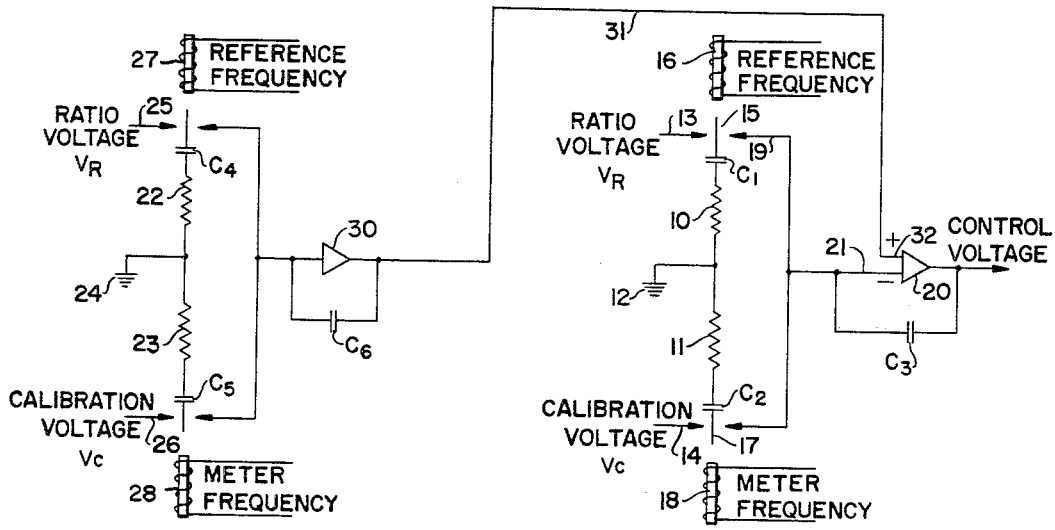
FIGURE 2 is a schematic drawing of the complete control system.

Referring now to FIGURE 2, there is shown at the right thereof the capacitor bridge circuit used for controlling the ratio of two phenomena or the blending of two materials. The bridge circuit consists of two capacitors C1 and C2 that are connected in electrical opposition to ground 12 through resistances 10 and 11. Normally, the capacitors C1 and C2 and the resistances 10 and 11 will all have the same values. The capacitor C1 is charged from a ratio voltage supply $V_R$ represented by the contact point 13. The ratio voltage supply is designed to be varied from zero percent of one material to one hundred percent of the material. The capacitor C1 is connected to the ratio voltage 13 by means of a switch 15 operated by a relay coil 16. The relay coil 16 is driven by a meter frequency or a reference frequency. In normal installations, 60 cycle commercial power may be used as a reference frequency to operate the relay 16 or the frequency from the flowmeter 9 may be used. A reference frequency is used when several streams are blended and each stream is provided with a blending controller. Thus each stream is controlled in relation to the reference frequency. When only two streams are blended a single controller can be used in combination with a flow meter in each stream. In this case the relay 16 is responsive to the signal from the flowmeter in the stream that is flowing free of control. In the system shown in FIGURE 1 the signal from the flowmeter 9 would be used to control the relay 16 of FIGURE 2. The second capacitor C2 is charged from a calibration voltage supply $V_c$ that is represented by the contact point 14. The calibration voltage $V_c$ should be variable in order that the controller can be adjusted when a reference or meter frequency is used as one input. The capacitor C2 is alternately connected to the calibration voltage $V_c$ by means of a switch 17 that is operated by a relay coil 18. The relay coil 18 is driven by a pulsed power supply whose frequency is related to the flow through one of the lines preferably line 3.

The two capacitors are discharged in electrical opposition by moving the switches 15 and 17 to the contacts 19 and 22, respectively. Normally, the system should be designed so that the relay operated switches 15 and 17 are normally closed against the voltage supply contacts 13 and 14. This insures that the capacitors will be fully charged when they are switched to a discharged position by the relay coils.

The two capacitors discharge in opposition to one input of a differential amplifier 20. More particularly, the capacitors are coupled to the negative input of the differential amplifier 20 with a capacitor C3 being disposed in the feedback circuit of the amplifier 20. Thus, the charge on the capacitor C3 will be equal to and of opposite polarity from the difference of the two input signals supplied to the amplifier. This voltage is used as a control voltage to move the valve 8 in line 3 having the flowmeter 6. The capacitor C3 should have a relatively large value compared to the capacitors C1 and C2, but the time constant of the circuit must be maintained relatively small to provide a fast response circuit. In normal practice it has been found that the capacitors C1 and C2 may have a value of .01 microfarad while the capacitor C3 may have a value of 1.0 microfarad.

The long response memory for the control circuit is provided by a second capacitor bridge circuit shown at the left of FIGURE 2 and similar to that described in the above referenced patent. The second bridge circuit consists of two capacitors C4 and C5 that are disposed in electrical opposition. The capacitors C4 and C5 are coupled for common ground 24 through resistances 22 and 23. Normally, the capacitors C4 and C5 will have a value substantially the same as the capacitors C1 and C2. The capacitor C4 is charged from the ratio voltage $V_R$ while the capacitor C5 is charged from the calibration voltage $V_c$. The ratio voltage represented by the contact 25 and the calibration voltage represented by the contact 26 are the same voltages as used in the first bridge circuit. The charging and discharging of the capacitor C4 is controlled by a relay operated switch 27 that responds to the reference frequency $f_r$ or a frequency related to the signal from meter 9. The reference frequency is the same reference frequency as used for driving the relay operated switch 16. The capacitor C5 is charged and discharged by means of a relay operated switch 28 which responds to the meter freqency $f_m$ that is the same meter frequency used for operating a relay operated switch 18. The two capacitors C4 and C5 are discharged in opposition through an operational amplifier 30 having a capacitor C6 in its feedback circuit. Thus, the charge in the capacitor C6 will be equal and opposite to the difference of the charges on the capacitors C4 and C5. Normally, the charge in the capacitor C6 will be zero or approximately zero.

The operational amplifier 30 provides an output signal that is supplied by means of a lead 31 to the positive input 32 of the differential amplifier 20. This signal will approach zero as the blend or mixture of the two streams approaches the desired totals of the two streams. The response of the second bridge circuit is made relatively slow by increasing the size of the capacitor C6. In normal operations it has been found desirable to have the capacitor C6 approximately 10 times the value of the capacitor C3 or a value of approximately 10 microfarads.

The combination of the fast response of the circuit at the right of FIGURE 2 and the slow response circuit of the left of FIGURE 2 results in a combined control that rapidly approaches an approximation of the desired ratio and then slowly approaches the exact ratio. As explained above, this results from the fact that the fast response system has a relatively fast memory while the slow response system has a slower memory. The combination of the two systems prevents the overshooting and oscillation of the control circuit and yet provides a very accurate final mixture. Likewise, the combination of the two circuits permits the control system to respond rapidly to changes in flow rates, as, for example, a sudden opening of the outlet or a sudden closing of the outlet valve. This type of response is impossible to achieve when using only a single capacitor bridge circuit such as described in the above-referenced patent. Thus, the product delivered by the present invention will be the exact blend desired regardless of how fast valves were opened or closed.

Overshooting or oscillation of the combined system is prevented since the memory circuit represented by amplifier 30 is not in series with the primary control loop. Thus the operation of the primary control loop represented by the amplifier 20 is more stable. Since the amplifiers 20 and 30 are both integrating circuits they will cause unstable operation when they are placed in series as required in the former systems.

In normal operations, the two flow lines 2 and 3 are sized so that the flow control valve 8 will always be partially throttled for all desired ratios of the two products. Also, the control valve 8 is designed so that it can respond rapidly to changes in the flow in the two lines. Normally, a response from fully open to fully closed of 5 to 6 seconds has been found satisfactory. Similarly, the flowmeters 6 and 9 are of the type that generate a series of pulses related to the flow through the lines 2 and 3. These pulses are supplied to a blending controller 7 constructed as shown in FIGURE 2, the controller adjusting the valve 8 to obtain the desired ratio. As explained above, in the past when using the capacitor bridge circuit disclosed in the above-referenced patent, one could either have a fast response system with a short memory and the resultant oscillations and overshooting or a slow response system and the result that the product delivered did not meet the desired blend of the to flow streams. This is especially true where the line 4 is used for filling a tank truck that must be filled within a very short interval of time, for example, 2 minutes. The control system does not have sufficient time to accurately blend the two materials unless it has a fast response coupled with a long memory.

While the above blending system is described using a flowmeter to measure the flow in each line and a single blending control, it is possible to operate using a blending control for each line. This type of operation is required when several products must be blended to provide a single mixture. When a separate blending control is used for each line, the flow in the line is compared to a fixed or reference frequency. Thus, the flow in each line is controlled with reference to the same frequency and each flow can be regulated as a fixed percent of the total mixture.

The ratio controller of the above-referenced patent solves the following equation $$V_R f_r C_1 = V_C f_m C_2$$

where $V_R$ is the ratio voltage, $f_r$ a reference or meter frequency, $C_1$ and $C_2$ capacitors of equal value, $V_C$ the calibration voltage and $f_m$ the meter frequency. Normally, $V_c$, $C_1$ and $C_2$ remain constant and $f_m$ varies with the flow rate in one stream. One assumes $f_r$ is a reference frequency, the flow in the one stream can be made any desired ratio of $f_r$. This ratio can be varied by changing the value of $V_R$. In this type of operation all streams must be controlled with respect to the reference frequency $f_r$.

In the case where only two streams are blended a single controller can be used with $f_r$ varying with the flow rate in the second stream. The ratio between the two streams can be varied by varying both $V_R$ and $V_C$ or only one of the two voltages. The most flexible control can be achieved by varying both $V_R$ and $V_C$ simultaneously and in equal amounts and opposite directions, i.e., as one voltage is increased a set amount the other voltage is decreased the amount. For example, if each voltage can vary from 0 to plus 15 volts, then when each voltage is 7½ volts the ratio of the two fluids will be 1 to 1. The voltage sources $V_R$ and $V_C$ may be supplied by a double potentiometer that is designed so that the two potentiometers operate in opposite directions. In addition, at least one of the potentiometers should be provided with a trimming means for initially balancing the two potentiometers. This will permit the controller to vary the quantity of either stream from zero to one hundred percent. It is not possible to achieve this range when a voltage dividing circuit is used to supply voltages $V_C$ and $V_R$.

The parallel memory circuit of this invention can be used with either of the above systems. Also, the parallel memory can be used on the controller for some lines and omitted from others when a large number of lines are blended.

Figure 3:
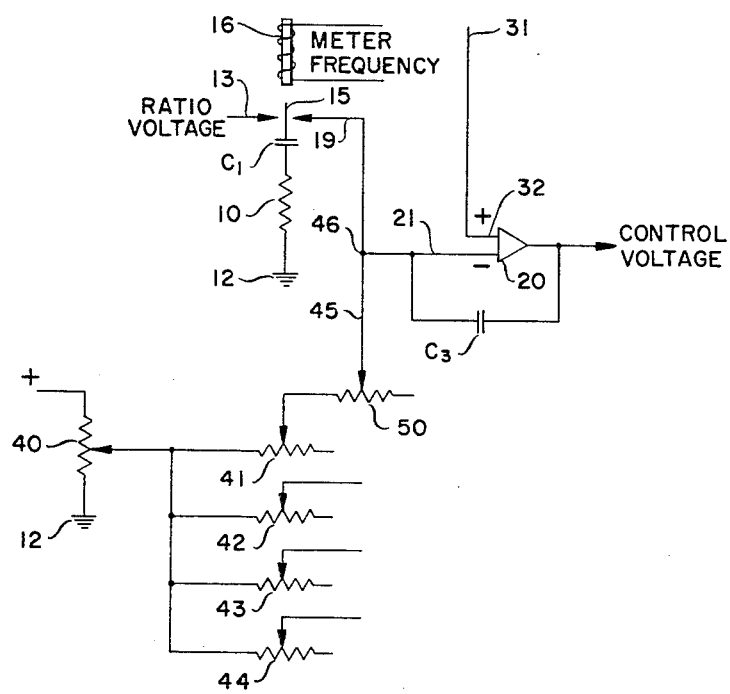
FIGURE 3 is a partial schematic drawing of a modified control system.

A further modification of the circuit is shown in FIGURE 3 and is useful when a number of streams are to be blended. Only a portion of the circuit shown in FIGURE 2 is shown in FIGURE 3, the portion not shown being the same as shown in FIGURE 2. The modified circuit uses only one-half of the capacitor bridge shown in FIGURE 2 and substitutes a fixed voltage for the reference frequency and ratio voltage. This is possible since a fixed frequency and fixed value capacitor supply a voltage that remains fixed unless the charging voltage changes.

The fixed voltage is supplied from a potentiometer 40 and variable resistance 41. The remaining blending controls are supplied with the same fixed voltage by leads 42–44, each containing a variable resistance. The fixed voltage is supplied by a lead 45 to a summing junction 46 where it is summed with the voltage from capacitor $C_1$. The ressistance 41 is used to balance the control during initial start-up and normally does not require further adjustment. At start-up the resistance is adjusted until the blending control is tracking the signal from the memory circuit shown in FIGURE 2. Thus, the resistance balances the fixed voltage with the remainder of the system.

The remainder of the circuit in FIGURE 3 is the same as shown in FIGURE 2 with the voltage 13 being the ratio voltage and the relay being operated at the meter frequency. The above circuit solves the equation $$V_C/R = f_m C_2 V_R$$

where $V_C$ is the fixed votlage and R is the resistance 41. Thus $$V_C = R f_m C_2 V_R$$

From this equation it is seen that if $V_R$ is decreased the flow of the product must increase to increase $f_m$ and maintain the equality. This provides a simple means by which the quantity of one product in the blend can increase while decreasing all other products. The ratio voltage for the one product is decreased and causes all the remaining product flows to decrease an amount related to the percentage of the product in the total mixture.

Of course, the same results can be achieved where a reference frequency is used in place of the fixed voltage. In this case an increase in the ratio voltage of one product will cause a proportional decrease in all other products. Also the same results are achieved by placing a resistance in series with R to control $V_R$ for one product.

The use of a fixed voltage when multiple products are blended has one additional advantage in that the quantity of final product can be controlled by controlling the fixed voltage. If the fixed voltage is reduced by one-half, then the flows of all products will be reduced one-half. The flow of the final product will be reduced one-half. Thus, the value or magnitude of the fixed voltage will determine the total flow of the final product. The control of the final product flow is achieved without causing any change in quantity or percentage of any product in the final blend.

I claim as my invention:

1. A ratio controller in which two auxiliary capacitors are charged proportional to two phenomena and discharged in opposition into a reservoir capacitor, the charge on the reservoir capacitor being related to the ratio of the two phenomena, the improvement comprising:

a differential amplifier, said reservoir capacitor being disposed in the feedback path of said amplifier, said two auxiliary capacitors being coupled in electrical opposition to one of the input terminals of said amplifier;

a capacitance bridge having two additional auxiliary capacitors coupled to be charged and discharged in electrical opposition;

a separate source of voltage for each additional auxiliary capacitor of said bridge, said separate sources of voltage also being used to charge said auxiliary capacitors;

switch means responsive to said phenomena to connect said additional auxiliary capacitors to the voltage supply to charge said additional auxiliary capacitors proportional to said two phenomena;

an operational amplifier, the discharge side of said additional capacitors being coupled in electrical opposition to the input side of said operational amplifier;

a second reservoir capacitor, said second reservoir capacitor being disposed in the feedback path of said operational amplifier; and the output side of said operational amplifier being coupled to the second input of said differential amplifier.

2. The ratio controller of claim 1 wherein all of the auxiliary capacitors have the same value and the second reservoir capacitor is approximately ten times as large as the first reservoir capacitor.

3. The ratio controller of claim 1 wherein one of said phenomena is a frequency related to a rate of flow and the second phenomena is a reference frequency.

4. The ratio controller of claim 3 wherein the voltages associated with each capacitor are fixed voltages.

5. A method for blending a plurality of components comprising:

charging a first separate auxiliary capacitor for each component at a reference frequency, all of the auxiliary capacitors being charged from the same power supply;

charging a second separate auxiliary capacitor for each component at a frequency related to the flow rate of each component, each of said second separate auxiliary capacitors being charged from a separate power supply, the voltage of each of the separate power supplies being controlled in proportion to the desired percentage of one component in the final blend;

discharging in electrical opposition the first and second auxiliary capacitors associated with each component to obtain an error signal for each component;

integrating the error signal for each component to obtain a control signal for each component; and controlling the flow of each component in response to said control signal.

6. A method for blending a plurality of components comprising:

supplying the same fixed reference voltage for each component;

charging an auxiliary capacitor for each component at a frequency related to the flow rate of each component, each of said auxiliary capacitors being charged from a separate power supply, the voltage of each of the separate power supplies being controlled in proportion to the desired percentage of the component in the final blend;

discharging in electrical opposition said reference voltage and the charge on each of said auxiliary capacitors associated with each component to obtain an error signal for each component;

integrating the error signal for each component to obtain a control signal for each component; and controlling the flow of each component in response to said control signal.

References Cited

UNITED STATES PATENTS

| | | | |
|---|---|---|---|
| 3,089,643 | 5/1963 | Idzerda et al. | 235—151.12 |
| 3,299,258 | 1/1967 | Borsboom et al. | 235—151.34 |

EUGENE G. BOTZ, Primary Examiner

U.S. Cl. X.R.

235—151.34, 179, 183